United States Patent [19]
Oberstein

[11] 4,136,798
[45] Jan. 30, 1979

[54] FLUSHABLE BEDPAN BAG

[76] Inventor: Nathan Oberstein, 55 Knolls Crescent, Bronx, N.Y. 10463

[21] Appl. No.: 714,838

[22] Filed: Aug. 16, 1976

[51] Int. Cl.² ............... B65D 25/16; B65D 25/34; A61G 9/00
[52] U.S. Cl. .................................. 220/408; 4/112; 4/DIG. 18; 220/455; 220/470; 220/DIG. 30; 229/88
[58] Field of Search ............... 4/110, 112, 243–245, 4/DIG. 18, 113, 113.1; 15/257.06; 220/63 R, 65, DIG. 30, 408, 455, 470; 229/3.1, 88

[56] References Cited

U.S. PATENT DOCUMENTS

| | | | |
|---|---|---|---|
| 1,761,111 | 6/1930 | Doty | 220/DIG. 30 |
| 3,263,241 | 8/1966 | Saulson | 4/112 |
| 3,546,716 | 12/1970 | Laumann | 4/112 |
| 3,695,989 | 10/1972 | Albert | 220/DIG. 30 |
| 3,763,502 | 10/1973 | Laumann | 4/112 |
| 3,906,555 | 9/1975 | Scott et al. | 4/112 |
| 3,936,890 | 2/1976 | Oberstein | 4/112 |

Primary Examiner—Stuart S. Levy
Attorney, Agent, or Firm—Kenneth E. Darnell

[57] ABSTRACT

A bag constructed of biodegradable material in the form of high dry-strength and no wet-strength paper combined with water-soluble plastic material laminated to a portion of the exterior of the bag. The bag is of a size to receive a bedpan as specifically disclosed but it may also be of a size to receive an emesis pan or the like when inserted therein with the bag completely enclosing the pan to maintain the aseptic characteristics of a sterile pan by completely preventing any possible contact between the pan and the patient or excreta from a patient thereby eliminating the necessity of cleaning and sterilizing bedpans, emesis pans and the like which results in substantial saving of time, labor and cost of caring for a patient. The bag, after use, is easily separated from the pan and flushed into the sewer system through a conventional commode with the water soluble plastic being dissolved by the flushing water and the paper becoming disintegrated so that the plumbing system will not become clogged. The water soluble plastic has the characteristic of maintaining its strength and impermeability charcteristics at temperatures above approximately 60 degrees F. so that excreta at body temperature will not dissolve the plastic material. However, the plastic becomes dissolved by water at temperatures below approximately 60 degrees F. so that when it is placed in a commode hopper or the like the flushing water which is at a temperature below approximately 60 degrees F. will dissolve the plastic material. The bag will also eliminate the use of bedpan liners, prevent staining of plastic pans, prevent odor from pentrating into plastic pans, extend the life of conventional pans, eliminate cold bed pans and assure the patient that the bedpans, emesis pan and the like is, in fact, sterile.

6 Claims, 3 Drawing Figures

FLUSHABLE BEDPAN BAG

BACKGROUND OF THE INVENTION

1. Field of the Invention

The present invention generally relates to a bag for a bedpan in which the bag is constructed of paper provided with a water soluble plastic material on a substantial portion of the exterior thereof with the bag being of a size to completely receive the bedpan when inserted therein thereby eliminating direct contact between the bedpan and the patient or excreta from the patient and enabling the bag to be separated from the bedpan after use and the bag along with any excreta to be disposed of by depositing it into a conventional hopper or commode and flushing the same into the plumbing system and ultimately into a sewage disposal system.

2. Description of the Prior Art

My prior U.S. Pat. No. 3,936,890, issued Feb. 10, 1976, and the prior art of record therein disclose bedpan liners which include structures for lining the interior of the bedpan and overlying the supporting flange of the bedpan. However, such devices leave a portion of the bedpan exposed thus still requiring that the bedpan be cleaned and sterilized after each use.

SUMMARY OF THE INVENTION

An object of the present invention is to provide a flushable bedpan bag which completely encloses a bedpan when inserted therein to prevent completely any contact between the bedpan and a patient or excreta from the patient when being used thereby eliminating the necessity of the bedpan being cleaned and sterilized subsequent to each use.

Another object of the invention is to provide a bedpan bag which may be easily separated into a rectangular member so that the bag and any contents of the bedpan may be lifted from the bedpan and disposed of by gathering the corners of the rectangular member together and lifting the bag out of the bedpan and depositing it in a hopper or commode.

A further object of the invention is to provide a bedpan bag in accordance with the preceding objects in which the bag is constructed of high dry-strength, no wet-strength paper having a water soluble plastic material laminated to a substantial portion of the exterior surface of the bag so that any portion of the bag that would come into contact with the liquid excreta from the patient will be covered by the water soluble plastic material which is dissolved by water at a temperature less than approximately 60 degrees F. but will not be dissolved by water or liquid at a temperature above approximately 60 degrees F. so that liquid excreta, at body temperature, about 98.6 degrees F., will not dissolve the plastic material thereby maintaining the structural integrity of the bag while the bedpan with the bag thereon is being used by the patient and for a substantial period of time thereafter thereby providing adequate time for an attendant to remove the bedpan and bag after use by a patient so that the bag may be removed from the bedpan and deposited in a commode whereby the liquid in the commode, when it is flushed, will dissolve the plastic and disintegrate the paper since the water in the plumbing system is less than approximately 60 degrees F.

Yet another important object of the invention is to provide a bedpan bag in accordance with the preceding objects in which the bag is provided with expanded gusset-type sides and a separable seam across one end and along the side portion thereof remote from the portion of the bag having the plastic material laminated thereto in order to facilitate separation of the bag from the bedpan by separating the bag along a center perforated seam at the bottom thereof and or along a side perforation.

Still another feature of the present invention is to provide a bedpan bag which is flushable and extremely simple to manufacture and utilize.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
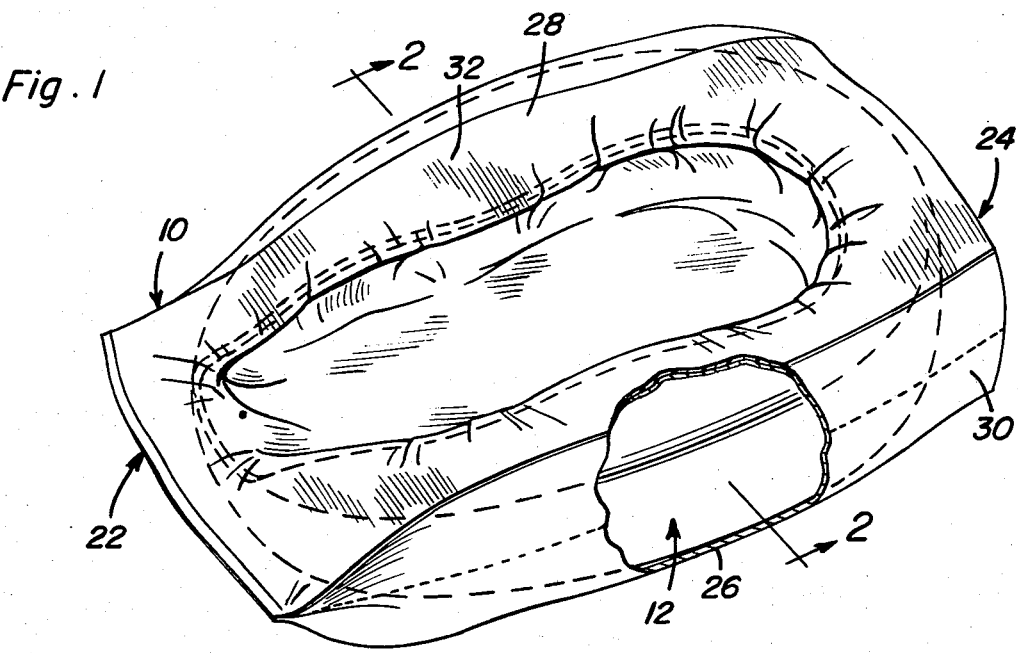
FIG. 1 is a perspective view of the bedpan and bag associated therewith with a portion of the bag broken away illustrating its relationship to the bedpan.

The bedpan bag of the present invention is generally designated by reference numeral 10 and is illustrated in use in combination with a conventional bedpan generally designated by reference numeral 12. The bedpan 12 is of conventional construction and includes a generally flat bottom 14, an upstanding peripheral wall 16 and an inturned, downwardly sloping top wall or flange 18 which forms a support for a person using the bedpan in a well known manner. The inturned supporting top wall or flange 18 is omitted at the front and is downwardly inclined and may be slightly concavely curved on its upper surface and provided with a general oval shaped configuration with the peripheral edge of the top wall or flange 18 being designated by numeral 20 and defining an opening by which excreta may be deposited into the bedpan under normal use conditions. The bedpan may be constructed of metal, plastic or any other material conventionally employed in constructing a bedpan.

Figure 2:
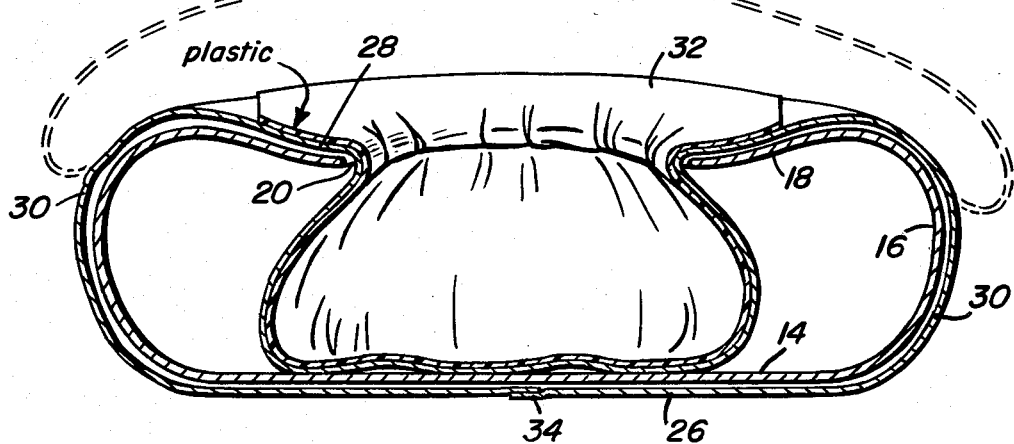
FIG. 2 is a transverse, sectional view taken substantially upon a plane passing along section line 2—2 of FIG. 1 illustrating the relationship between the bag and the bedpan with the separation of the bottom of the bag and gathering of the corners and edges thereof being illustrated in broken line.

The bag 10 is generally elongated and oriented horizontally with a closed end 22 and an open end 24 and includes a generally horizontally disposed bottom wall 26, a horizontally disposed top wall 28 and a pair of opposed sidewalls 30 interconnecting the bottom and top walls 26 and 28 with the sidewalls being of the gusseted-type to enable expansion of the bag so that the top wall 28 and bottom wall 26 may be moved apart when the bag is opened so that the bedpan 12 may be inserted into the open end 24 of the bag 10 to an extent that the bag completely encloses the bedpan as illustrated in FIG. 1. The top wall 28 of the bag 10 is provided with a layer of water soluble plastic material 32 laminated thereto with the central portion of the top wall 28 and the plastic layer or coating 32 being forced downwardly and outwardly slightly as illustrated in FIG. 2 thus forming a recess for receiving excreta from a patient. As illustrated in FIG. 2, the side edges of the plastic layer 32 extend outwardly along a substantial portion of the top wall or flanges 18 of the bedpan so that any possible area of the bag that will be contacted by liquid excreta will be covered by the plastic layer 32. The complete enclosement of the bedpan within the bag completely eliminates any possible contact between the bedpan and the patient or excreta from the patient. The open end of the bag is such that it will be spaced from the corresponding end portion of the bedpan and may be temporarily folded over to form a closure to facilitate handling of the assembled bag and bedpan without contact with the patient or excreta from the patient.

Figure 3:
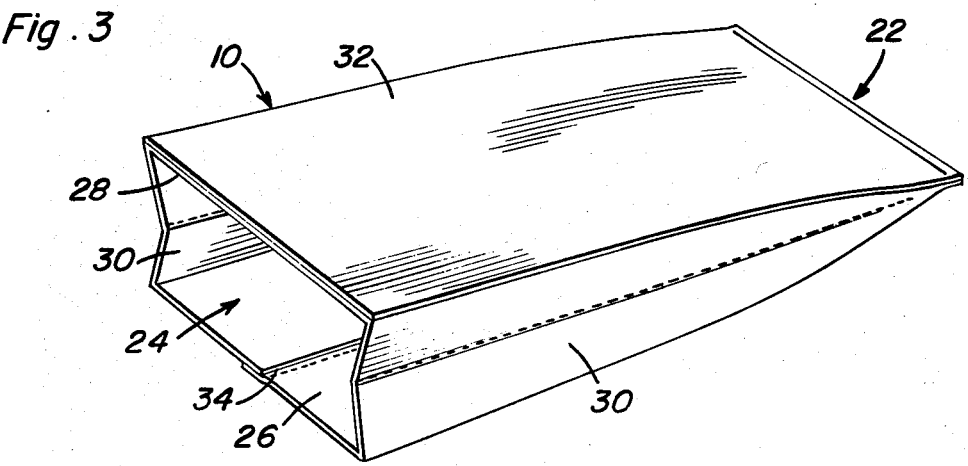
FIG. 3 is a perspective view of the bedpan bag.

The bottom wall 26 of the bag is defined by two segments joined together along an adhesive seam or juncture 34 which extends longitudinally from end to end of the bag. There may also be a perforated line 35 running along the adhesive seam 34. Also, a perforated line 36 may be provided in each sidewall 30 as illustrated in FIG. 3. The seam 34 may be adhesive in nature but readily separated by exerting a separating force thereon. This may be accomplished by overlapping the free edges 38 along the seam 34. This construction enables the bottom wall 26 to be opened longitudinally and the end edges of the bottom wall 26 opposite from the open end being separated so that the side edges and corners of the segments of the bottom wall can be gathered and raised upwardly thereby enabling the bag to be removed from the bedpan and deposited in a hopper or commode. This removing operation can best be accomplished when the bedpan is resting on a flat surface to facilitate retention of the bedpan in a stable condition when removing the bag therefrom.

The water soluble plastic layer 32 may be extruded as a film and then laminated directly to the bag surface so that it completely covers the top wall. The plastic material may be distinguishably colored from the bag to facilitate proper orientation of the bag in relation to the bedpan. Another method of attaching the water soluble plastic to the bag is by extruding the plastic in a film and then laminating it to a thin tissue paper with this thin tissue paper with the laminated plastic thereon being laminated onto the bag. The water soluble plastic material is a commercially available hydroxypropyl cellulose which has the characteristics of being water soluble in temperatures below approximately 60 degrees F. but being stable and non-soluble at temperatures above approximately 60 degrees F. Thus, human excreta usually at about 98.6 degrees F. will not dissolve the bag and adequate time exists for an attendant to remove the bedpan bag from its association with a patient and take this assembly to a desired disposal point, separate the bag seam and remove the bag and any excreta therein from the bedpan and deposit it in a hopper or commode in which the flushing water is at a temperature below approximately 60 degrees F. thus dissolving the plastic material and disintegrating the no wet-strength paper so that the plumbing system will not become clogged. This enables the use of bedpans without sterilization after each use since the bag will maintain the aseptic characteristics of the bedpan as compared with present liners which expose a portion of the bedpan to contact with various germs, staph infections and the like which can come into contact and be transmitted by surfaces of the bedpan not covered by existing liners. As compared with this, the present bag completely covers and encloses the bedpan and prevents any possible contamination of the bedpan thereby enabling it to be used sequentially by various patients without any possibility of transferring infection from one patient to another. By eliminating the need to clean and sterilize each bedpan, the cost of patient care can be substantially reduced.

Additionally, the bag will prevent staining of plastic bedpans and odor penetration of plastic bedpans and extend the life expectancy of any type bedpan and further render the bedpan more comfortable to the patient since there will be no direct contact between a relatively cold bedpan and skin surface of the patient.

While the bag has been illustrated specifically in combination with a bedpan, it can just as readily be constructed of a size to be used in combination with a kidney-shaped emesis pan or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an improved bag for enclosing a bedpan, emesis pan, or the like, comprising a bottom wall, top wall and side walls interconnecting the top and bottom walls to form a complete enclosure for the pan with a portion of the top wall being disposed downwardly into an opening in the top of the pan to thereby completely enclose and protect the pan from contact with a patient and excreta therefrom and to maintain the pan sterile, thereby eliminating the necessity of cleaning and sterilizing the pan after each use, at least a portion of the top wall of the bag, which portion normally contacts excreta from the patient, being formed of a material which is water-insoluble at temperatures approximating body temperature and which is water soluble at liquid temperatures approximately that of water in a plumbing system to enable disposal of the bag and excreta by depositing in a commode for flushing into a sewage disposal system, the improvement comprising a separable seam formed in the bottom wall of said bag, said seam being closed prior to and during use of the bedpan by a patient, the seam being adapted to be opened to form an opening in the bottom wall of the bag along said seam to allow the bottom wall to be displaced outwardly and upwardly from the bedpan to enable the bedpan to be removed from the bag through the opening formed along said seam.

2. In the improved bag of claim 1 wherein the seam is disposed longitudinally of the bag.

3. In the improved bag of claim 2 wherein the improvement further comprises a perforated line formed in each of said side walls to facilitate separation of the bag to form a pocket-like pouch for excreta positioned in the top portion of the bag when removing the bag from the bedpan.

4. In the improved bag of claim 3 wherein said bag is constructed of high dry-strength paper and no wet-strength paper to facilitate its disintegration when deposited in a commode.

5. In the improved bag of claim 4 wherein the side walls of the bag are of the gusset-type to enable vertical expansion of the bag when the bedpan is inserted thereinto.

6. In the improved bag of claim 1 wherein the improvement further comprises a laminated layer of water soluble plastic material that is water soluble at water temperatures below approximately 60 degrees F. and non-water soluble at temperatures above approximately 60 degrees F., the layer being disposed over at least said portion of the top wall of said bag.

* * * * *